United States Patent

[11] 3,625,860

| [72] | Inventors | John A. Condrasky<br>Tokyo, Japan;<br>Robert E. Kline, Pittsburgh; Stanley J.<br>Kwolek, New Kensington, both of Pa. |
|---|---|---|
| [21] | Appl. No. | 853,487 |
| [22] | Filed | Aug. 27, 1969 |
| [45] | Patented | Dec. 7, 1971 |
| [73] | Assignee | Gulf Research & Development Company<br>Pittsburgh, Pa. |

[54] PROCESS FOR REACTIVATING A REFORMING CATALYST
3 Claims, No Drawings

[52] U.S. Cl.................................................. 252/415,
208/139, 208/140, 252/419, 252/442, 252/466 PT
[51] Int. Cl........................................................ B01j 11/18,
B01j 11/80
[50] Field of Search............................................ 252/415,
419, 416; 208/140, 139

[56] References Cited
UNITED STATES PATENTS

| 2,785,138 | 3/1957 | Milliken, Jr. ................ | 252/415 |
|---|---|---|---|
| 2,785,139 | 3/1957 | Heinemann.................. | 252/415 |
| 2,897,137 | 7/1959 | Schwarzenbek............. | 208/140 |
| 3,011,967 | 12/1961 | Schmitkons et al........... | 208/140 X |
| 3,147,229 | 9/1964 | Hinlicky et al................ | 252/415 |
| 3,400,073 | 9/1968 | Schwarzenbek et al. ..... | 252/419 X |

FOREIGN PATENTS

| 789,791 | 1/1958 | Great Britain................ | 208/140 |

*Primary Examiner*—Daniel E. Wyman
*Assistant Examiner*—P. E. Konopka
*Attorneys*—Meyer Neishloss, Deane E. Keith and Thomas G. Ryder

ABSTRACT: A method for activation and/or reactivation of noble metal-type catalysts employed in the reforming of hydrocarbons in the presence of hydrogen by treatment of such catalysts under particular conditions with a chloride-containing compound.

PROCESS FOR REACTIVATING A REFORMING CATALYST

This invention relates to a process for activation and/or reactivation of noble metal-type catalysts employed in the reforming of hydrocarbons in the presence of hydrogen.

The use of reforming catalysts containing platinum metals is well known in the art. It has also been suggested in the art that such catalysts could be promoted or activated by the treatment thereof with halogen-containing compounds in order to increase the reforming activity thereof. In one aspect our invention relates to a particular method of activating reforming catalysts containing platinum metals by the treatment thereof with a halogen under particular conditions in order not only to increase the initial reforming activity of the treated catalyst but also to prevent the rapid deactivation of such catalysts while in use.

It is also known in the art that reforming catalysts gradually tend to lose their activity as the result of carbonaceous materials being deposited thereon during the course of their employment in the reforming process. It has previously been suggested in the art that such deactivated catalysts could be regenerated by subjecting them to an oxidative burn-off whereby such carbonaceous deposits are burned to form carbon dioxide thereby removing the carbon from the catalyst. While such oxidative burn-off techniques have been quite effective for the removal of carbon from reforming catalysts, it has been found that when such catalysts have been subjected to a series of processing cycles, each comprised of reforming of hydrocarbons and regeneration via oxidative burn-off, that although the oxidative burn-off treatment is effective to remove substantially all carbon from the catalyst, the activity level achieved after each subsequent reactivation is somewhat lower than that achieved in the previous cycle. Furthermore, the rate of deactivation of the reforming catalyst in each subsequent operating cycle is also somewhat greater than in the previous cycle. It would appear, therefore, that a substantial portion of the loss in activity on the part of the reforming catalysts from cycle to cycle is caused by something other than the mere deposition of carbonaceous materials upon the catalyst.

In accordance with our invention a reforming catalyst containing a platinum metal is activated by subjecting the catalyst to chloride treatment by contacting it with a nonmetallic chloride-containing compound at a temperature from about 500° F. to about 1,150° F. and preferably at a temperature from about 700° to about 900° F. The chloride compound employed in this treatment can be an organic chloride such as tertiary butyl chloride, propylene dichloride, carbon tetrachloride, etc., or a nonorganic chloride such as, for example, hydrogen chloride. Chlorine gas is not to be employed. In any event, whatever chloride compound is employed, the temperature employed must be sufficient so as to effect decomposition of the chloride compound. Additionally, there must be a quantity of hydrogen within the system during chloride treatment equal to the stoichiometric amount required to form hydrogen chloride with the chlorine obtained from the chloride compound. At the same time there must be a substantial absence in the system of free oxygen or compounds that decompose at the treating conditions to produce free oxygen. Generally, the quantity of chloride compound employed must be sufficient to provide in the system from about 0.0005 to about 0.01 pound of chlorine per pound of catalyst and preferably at least about 0.001 pound of chlorine per pound of catalyst.

In the conduct of this chloride treatment we have found that it is essential that the catalyst have a water content of less than about 0.01 pound of water per pound of catalyst. If the catalyst to be activated contains an excessive amount of water, it can be dried prior to treatment by any of the techniques well known in the art such as, for example, employment of an elevated temperature so as to assist in vaporizing water, sweeping the catalyst with dry gas, etc. When employing an elevated temperature to promote drying, it is important that precautions be taken to preclude a buildup of water vapor in a closed system so as to prevent hydrothermal treatment of the catalyst.

Additionally, when practicing the present chloride treatment of a catalyst of low water content in a typical commercial reaction zone containing ferrous components, it has been discovered that comparatively high concentrations of chloride can be maintained without any adverse effects. Thus, it has been theorized on the basis of thermodynamic considerations that the formation of iron chloride from metallic iron or iron oxide in the presence of hydrogen and chlorine is governed by the partial pressure of the hydrogen and the partial pressure of the halogen (considered as HC1) in the zone of the reaction. For example, in the reversible reaction $Fe + 2HCl \rightleftharpoons FeCl_2 + H_2$ the value of the equilibrium constant ($K_p$) increases in proportion to temperature. Thus, at 773° K. (930° F.), $K_p = 1.23 \times 10^{-3}$; while at 673° K. (750° F.), $K_p = 4.0 \times 10^{-5}$. Inasmuch as $K = (p(HCl)^2 / p(H_2))$ there is a minimum HCl partial pressure required for any prevailing hydrogen pressure to cause formation of iron chloride (considered as $FeCl_2$). By remaining below this minimum pressure, which can be calculated theoretically for any given system, formation of $FeCl_2$ from available iron would appear to be avoided. It has previously been thought that a partial pressure of chloride (considered as HCl in a hydrogen atmosphere in excess of 15 percent of the equilibrium value, or $K_p$ value, would result in formation of iron chloride and migration thereof to active sites of a platinum catalyst resulting in a poisoning effect thereon. In accordance with our invention, however, it has been discovered that, apparently due to the operating conditions required by our invention, chloride contents (expressed as HCl well in excess of 15 percent of the $K_p$ value can be satisfactorily employed.

While the above-described technique is applicable to the activation of substantially carbon-free fresh catalysts, we have found it is particularly advantageous to incorporate such technique in a method for reactivating catalysts which have become deactivated through employment in a reforming process, i.e. a combined regeneration-reactivation procedure. Especially desirable results are obtainable when practicing such procedure wherein the individual steps are conducted in a particular manner apparently adapted to provide a beneficial, integrated reactivation method.

In accordance with this preferred embodiment, our invention is directed to a method for technique a reforming catalyst containing platinum metals, which catalyst has become deactivated through employment in a series of reforming-regeneration cycles. This method comprises first subjecting the deactivated catalyst to an oxidative burn-off at a temperature up to about 900° F. for a period of time sufficient to remove substantially all carbonaceous deposits therefrom. Quite commonly this oxidative burn-off is accomplished in two phases, the first of which is principally a carbon burn-off phase, while the second phase can be termed an afterburn. In accordance with this technique the carbon burn-off phase of our process can be effected by contacting the carbon-containing catalyst with an oxygen-containing gas, preferably a molecular oxygen-containing gas, having a comparatively low oxygen content, e.g. less than about 1 percent by volume and preferably less than 0.8 percent by volume. The temperature employed in such carbon burn-off technique ranges from the minimum temperature necessary to effect oxygen-containing of the carbon in the presence of the oxygen-containing gas up to a maximum temperature of about 850° F. In the afterburn phase, generally a gas of a comparatively higher oxygen content is employed, e.g. up to about 2 percent by volume of oxygen. In this afterburn technique the maximum temperature employed is about 900° F. The temperature in the carbon burn-off phase of our invention in the oxidative burn-off step can readily be controlled by adjustment of the oxygen content of the oxygen-containing gas.

After the oxidative burn-off, the substantially carbon-free catalyst is next subjected to an oxygen treatment with a gas containing at least about 5 percent by volume of molecular oxygen at a temperature in the range from about 800° F. to about 1,150° F. In this oxygen treatment step of our invention any suitable oxygen-containing gas can be employed including, for example, air, air diluted with an inert gas such as nitrogen or oxygen enriched air. Preferably, however, the oxygen-containing gas will be comprised of from about 5 to about 15 percent by volume of molecular oxygen. While the oxygen treatment step of our invention can be conducted within the temperature ranges set forth previously, it is preferred to employ lower temperatures within such ranges such as less than about 1,050° F. or even less than 950° F. We particularly prefer to employ temperatures below 900° F. and find that temperatures in the range from 825° to 875° F. are quite satisfactory. The duration of the oxygen treatment can be quite brief or can extend for a period of a few days. Generally, it is preferred to conduct the oxygen treatment step for a period from about 4 to 36 hours with treatment times in the range from about 10 to 24 hours being quite satisfactory.

While it is not necessary to employ superatmospheric pressures in the oxygen treatment step of our invention, it is usually convenient to do so. Thus, total pressures up to about a few hundred p.s.i.g. can be employed, although normally, the total pressure is maintained at a level below about 100 p.s.i.g. We prefer to employ total pressures below about 75 p.s.i.g., such as, for example, total pressures in the range from about 25 to about 60 p.s.i.g. Additionally, the employment of excessively high oxygen partial pressures in our oxygen treatment step does not appear to provide any particular advantage and accordingly we prefer to maintain oxygen partial pressures at a level below one atmosphere. We find, for example, that oxygen partial pressures in the range from about 3 to about 10 p.s.i. can be used and oxygen partial pressures below 6.5 or 6.75 p.s.i. are quite satisfactory.

After the oxygen-treatment step, the catalyst is then purged of molecular oxygen. The purging can be conducted by any of the techniques well known in the art such as, for example, by flowing an inert gas such as nitrogen through the catalyst. The technique of evacuating the catalyst-containing system followed by breaking the vacuum with an inert gas can also be employed. Similarly, the technique of evacuating and then sweeping the catalyst with an inert gas can be employed repeatedly, if necessary.

After the catalyst has been freed of molecular oxygen, is is then reduced by contact with hydrogen at a temperature from about 800° to about 1,150° F. The technique of reducing with hydrogen is well known in the art. In this invention it is preferred to employ a reduction temperature in the range from about 850° to 950° F., such as, for example, about 900° F.

The reduced catalyst is then subjected to the chloride treatment in substantially the manner described previously. Since, as mentioned above, it is essential that the catalyst be in a substantially dry state for the chloride treatment, it is, therefore, essential in the present method that the catalyst be dried prior to effecting the chloride treatment step. It is not essential, however, that such drying be effected as a separate step immediately prior to the chloride treatment step. In fact, it is preferred to commence drying during the latter period of the oxidative burn-off step described above and continue the employment of drying techniques during the oxygen treatment, purging and reduction steps. Thus, for example, the employment of a circulating, dry, oxygen-containing gas during the oxidative burn-off, i.e. both the carbon burn-off and afterburn phases will assist in drying as well as the employment of circulating, dry, oxygen-containing, purging gases and hydrogen in the appropriate steps. It must also be pointed out that it is not absolutely critical that the catalyst be bone dry prior to the chloride treatment but the catalyst must not have a water content greater than about 0.01 pound of water per pound of catalyst and preferably should have a water content of less than about 0.005 pound of water per pound of catalyst.

In a commercial installation employing a system of circulating gases in a reforming unit, the circulating gases can be employed to strip water from the catalyst after which the water is removed from the circulating gas before return to the catalyst thereby providing comparatively dry gases for the stripping of water from the catalyst. Again, the technique employed for removing or reducing the water content of circulating gases are well known in the art and include, for example, condensation and adsorption such as, for example, by a molecular sieve. When employing techniques such as these with a circulating gas the water content of the gas exiting from the catalyst can be used as an accurate indication of the water content of the catalyst.

It is theorized that when employing the method of our invention for the reactivation of platinum-containing reforming catalysts which have become deactivated, that the various individual steps combine to provide individual effects which result in an overall reactivation of the catalyst in a manner resulting in a finally reactivated catalyst having an activity level at a rate of deactivation equal to if not superior to that of a fresh catalyst. Thus, the oxidative burn-off step of our method frees the catalyst of substantially all carbonaceous deposits which in and of themselves appear to block catalytically active sites and thus reduce the activity of the catalyst but also removes such carbonaceous deposits so as to permit further advantageous treatment of the catalyst in accordance with our invention.

The oxygen treatment step of our invention is believed to place the catalytically active metallic materials, i.e. platinum metals, in a state which makes them more receptive to the subsequent chloride treatment of our invention. While this oxygen treatment may be sufficiently severe to convert the catalytically active materials substantially into the oxide form such is not believed to be necessary and oxygen treatment under milder conditions appears to be equally effective. While this oxygen treatment appears to render the catalyst more susceptible to the subsequent chloride treatment of our invention, the simultaneous oxygen and chlorine treatment of the catalyst does not eliminate the necessity for the subsequent and separate chloride treatment of our invention. In fact it is believed that a simultaneous oxygen and chlorine treatment appears to serve no purpose other than merely increasing the chlorine content of the catalyst.

The reduction step of our invention in addition to reducing the catalyst in the manner which might be expected in view of the state of the art also appears to serve the dual function of finally preparing the catalyst for our chloride treatment and also insuring that such chloride treatment is conducted in substantially the complete absence of any molecular oxygen.

Finally, the drying of the catalyst as required by our method is essential so that the chloride treatment is conducted in the presence of a minimum quantity of water. This is particularly important since the presence of excessive quantities of water appear to diminish if not destroy the effectiveness of our chloride treatment.

It is believed that the chloride treatment of the catalyst under the proper conditions provided in accordance with our method, is operative not merely to increase the overall chlorine content of the catalyst but rather it is believed that such chloride treatment results in a dispersion of the platinum across the surface of the catalyst so as to counteract the agglomeration of platinum crystallites believed to occur during use of such catalyst in a reforming operation. Such dispersion or redispersion of platinum would appear to account for both the extremely high level of activity obtained by the method of our invention as well as the extremely low rate of deactivation obtained.

In order to illustrate our invention in greater detail, reference is made to the following examples.

EXAMPLE I

A commercially available platinum on alumina reforming catalyst containing about 0.4 percent by weight platinum was employed as a catalyst in the reforming of a naphtha stock containing less than 1 p.p.m. sulfur. In the first reforming cycle employing fresh catalyst the initial yield of debutanized reformate was about 88 percent by volume based on the reactor charge. This first cycle was continued for a period of approximately 16 months and a catalyst age of about 74 barrels per pound at which time a debutanized reformate yield of about 84 percent was obtained. Charging of the naphtha feed stock was then discontinued and the catalyst was regenerated by subjecting it to an oxidative burn-off in order to remove carbon from the catalyst. After regeneration, charging of naphtha feed stock was recommenced in a second reforming cycle. This procedure of reforming followed by regeneration was continued through five operating cycles. As an indication of the extent of catalyst deactivation not overcome by regenerative oxidative burn-off it is pointed out that the third cycle was continued in operation for a period of about 4 months with a cycle catalyst age of about 32 barrels per pound. At the beginning of the third cycle a debutanized reformate yield of about 87 percent by volume based on charge stock was obtained, while at the end of the third cycle the yield had dropped to only about 79 percent by volume. The fourth cycle lasted about 2 months and in the beginning of the fifth cycle, after a regenerative oxidative burn-off, the initial yield of debutanized reformate was only 85 percent by volume based on charge stock nd after only about 3 weeks operation and a catalyst cycle age of 3.2 barrels per pound the yield of debutanized reformate had dropped to about 81.5 percent. At this time charging of the naphtha feed was discontinued due to the extremely rapid rate of catalyst deterioration. Due to the fact that the length of each successive cycle was becoming progressively shorter, the initial activity of the catalyst at the beginning of each cycle was also decreasing from one cycle to the next and that the rate of deterioration of catalyst activity within a cycle was increasing more and more rapidly it was apparent that further employment of a regenerative oxidative burn-off would not adequately restore the activity of the catalyst. At this point in time, reactivation of the deactivated catalyst in accordance with our invention was undertaken.

Accordingly, after discontinuing charge of the naphtha feed stock, the reforming unit was freed of hydrogen by depressuring and evacuating followed by a low pressure purge with nitrogen. Simultaneously, the temperature of the reactor system was decreased from the comparatively higher reforming temperature down to a level below about 750° F. The unit was repressured with nitrogen up to a level in the range of from 50 to 75 p.s.i.g., after which nitrogen was circulated over the catalyst bed while adjusting the inlet and outlet temperatures to 750° F. After temperature lineout, a small amount of air was added to the circulating nitrogen so as to give an oxygen content of about 0.6 percent. Burning of the carbonaceous deposits on the catalyst then commenced. This carbon burn-Off phase of the oxidative burn-off continued for about 20 hours during which time the maximum outlet temperature from the reforming reactor system was about 850° F. The temperature was then increased to about 900° F., while the oxygen content of the circulating gas entering the unit was increased to a level of about 1.5 to 2.0 percent in order to effect the afterburn phase of the oxidative burn-off. Dry air, substantially free of any water content, was added to the circulating nitrogen stream during this afterburn phase.

The inlet temperature to the reforming reactor was adjusted to 800° F. while the oxygen content of the circulating gas was adjusted to 1.4 percent. The inlet temperature was then increased to 850° F. over the course of the next hour and the pressure was adjusted to about 50 p.s.i.g. Thereafter the oxygen content of the circulating gas was increased to 5 percent over the course of the next one-half hour. The inlet temperature was then increased another 50° F. to 900° F. the oxygen content of the circulating gas was then gradually increased reaching a level of about 10 percent oxygen about 5 hours after raising the temperature to 900° F. For the next 12 hours the oxygen content of the circulating gas was maintained at a level above 10 percent and was eventually raised from the level of about 10 percent up to a level of about 14 percent during the final hour of this 12-hour period. Throughout this 12-hour period the temperature measured at the reactor inlet was maintained in the range from about 900° F. to about 910° F. At the end of this 12-hour period, addition of air to the reforming reactor system was discontinued and the fired heaters were cut out of the system, while circulation of the nitrogen gas was continued so as to cool the catalyst to a temperature below 700° F.

The reforming reactor system was then purged of oxygen after which the reactor system was evacuated and the vacuum broken with dry nitrogen. Again the system was evacuated and the vacuum was broken with dry reformer hydrogen and the system repressured to 25 p.s.i.g. This sequence of evacuation followed by repressuring with hydrogen was repeated several more times until finally the reactor system was repressured to 200 p.s.i.g. with dry reformer hydrogen while maintaining a temperature of 700° F. The temperature was then increased from 700° to 900° F. at the rate of 100° F. per hour and the temperature of 900° F. was maintained for an additional hour.

After completion of the reduction step through hydrogen treatment described above, the temperature was reduced from 900° F. to a level of 700° F. while the system pressure was increased from 200 p.s.i.g. to 250 p.s.i.g. over a 3-hour period. While the temperature was at the 900° F. level chloride treatment of the catalyst was commenced by adding propylene dichloride to the reformer system at the rate of 0.0004 pound per pound of catalyst per hour and such addition was continued for 12 hours.

During all of the above-described operations the circulating gas streams were subjected to drying and the water obtained thereby was removed from the system.

Immediately after completion of the chloride addition and reaching the reduced temperature of 700° F., charging of the same naphtha stock mentioned previously was commenced. During the initial period of operation of this first cycle after reactivation in accordance with our invention the yield of debutanized reformate obtained was 89 percent by volume based on naphtha charge and had a Research Octane Number clear of 90. This cycle was continued for a period approaching 6 months continuous operation, when the unit was shut down for normal refinery maintenance. The catalyst cycle age at this time was about 28 barrels per pound and the yield of debutanzied reformate obtained was still at the level of about 89 percent. The reactivated catalyst was then subjected to a regenerative oxidative burn-off only and returned to onstream operation of the conclusion of normal refinery maintenance. At the beginning of the second cycle after reactivation, the yield of debutanized reformate was still at the level of 89 percent. This second cycle has been in operation for a period approaching 5 months continuous use without any appreciable decrease in yield of debutanized reformate or any indication of catalyst deactivation. From the present yield and a deactivation rate comparabe to a fresh catalyst, a catalyst cycle life in excess of 65 barrels per pound is anticipated.

From the above discussion it will be seen that the method of our invention is effective in the treatment of a catalyst which can no longer be returned either to its initial state of activity or even a satisfactory state of activity by conventional regeneration techniques. Our treatment reactivates such catalyst so as to raise it to an activity level equal to or greater than that initially possessed by a fresh catalyst. Further, it will be noted that the reactivation method of our invention not only provides a reactivated catalyst containing an initially high level of activity but that such reactivated catalyst is not subject to rapid deactivation as with conventionally regenerated catalysts.

EXAMPLE II

A platinum on alumina reforming catalyst which has become deactivated through employment in several cycles of a hydrocarbon reforming process is subjected to an oxidative burn-off treatment to remove carbonaceous deposits therefrom followed by an oxygen treatment with a gas containing greater than about 10 percent oxygen. Thereafter, oxygen is purged from the system and the catalyst is reduced by contact with a hydrogen-containing gas at an elevated temperature. The reduced catalyst is then returned to onstream service for the reforming of a naphtha stock to which is added a chlorine-containing material in a quantity sufficient to provide at least about 0.002 pound of chlorine per pound of reforming catalyst. This chlorine addition is practiced for a period of about 4 to 5 hours during the initial onstream period. The yield of reformate immediately after discontinuance of chlorine addition is significantly higher than that obtained prior to regeneration but, however, is not equivalent to that obtained with a fresh reforming catalyst. Furthermore, the reforming catalyst regenerated in accordance with this example is found to deactivate at an unsatisfactory rapid rate.

EXAMPLE III

A platinum on alumina reforming catalyst which has become deactivated through employment in a plurality of cycles in a reforming operation is subjected to a regenerative oxidative burn-off to remove carbonaceous material therefrom after which the substantially carbon-free catalyst is contacted with a gas containing at least about 10 percent oxygen and about 0.001 percent chlorine. After this contacting, the catalyst is purged of the oxygen and chlorine-containing gas and subjected to reduction by contact with hydrogen at elevated temperatures. Thereafter, the treated catalyst is once more employed for the reforming of a naphtha stock and it is found that the activity of the catalyst is substantially improved over that of the deactivated catalyst although the yield of reformate and activity of the catalyst is less than that obtained with a fresh catalyst. Moreover, it is found that such treated catalyst deactivates more rapidly than does a fresh catalyst and quickly reaches a point where the rate of deactivation is unsatisfactorily rapid.

EXAMPLE IV

The technique described in example I was substantially duplicated with but minor variations in the temperature and pressure being employed. In the conduct of such sequence of operating steps, however, only a minimum quantity of water was removed so that the catalyst subjected to the chloride treatment contained about 0.02 pound of water per pound of catalyst. The treated catalyst was then returned to onstream service and it was found that the yield of reformate and the activity of the treated catalyst was almost equivalent to that of the fresh catalyst. After but an extremely short period of operation (about 6 weeks) it was found that the activity of the treated catalyst had been reduced about 20 percent of the level initially obtained immediately after treatment and that the activity of the catalyst was decreasing rapidly.

We claim:
1. A process for reactivating in a reaction zone containing ferrous components a platinum-containing alumina reforming catalyst which has become deactivated through employment in the reforming of a hydrocarbon, which process comprises:
 1. Subjecting the deactivated catalyst to an oxidative burn-off at a temperature up to about 900° F. for a period of time sufficient to remove substantially all carbonaceous deposits therefrom;
 2. Subjecting the substantially carbon-free catalyst to an oxygen treatment with a gas containing at least about 5 percent per volume of molecular oxygen at a temperature in the range from about 800° F. to about 1,150° F. for a period of at least 4 hours;
 3. Purging the catalyst of molecular oxygen after the oxygen treatment;
 4. Reducing the molecular oxygen-free catalyst by contacting it with hydrogen at a temperature from about 800° F. to about 1,150° F.;
 5. Subjecting the reduced catalyst to chloride treatment in the absence of hydrocarbons by contacting the catalyst with a nonmetallic chloride-containing compound in a quantity sufficient to provide from about 0.0005 to about 0.01 pound of chlorine per pound of catalyst, which cloride-containing compound is decomposable at contacting conditions, in the presence of a quantity of hydrogen at least equal to the stoichiometric amount required to form hydrogen chloride with the chlorine obtained from the chloride compound while maintaining a partial pressure of chloride, considered as HCl in the presence of the hydrogen in excess of 15 percent of the $K_p$ value and in the substantial absence in the system of free oxygen and compounds that decompose at the treating conditions to produce free oxygen and at a temperature from about 500° F. to about 1,150° F. and under substantially nonoxidative conditions;
 6. Prior to the chloride treatment, drying the catalyst to a water content no greater than about 0.01 pound of water per pound of catalyst.

2. The process of claim 1 wherein the oxidative burn-off is effected by contacting the deactivated catalyst with a gas containing up to about 2 percent by volume of molecular oxygen, the oxygen treatment is conducted at a temperature of less than about 1,050° F. for a period of time from about 4 to about 36 hours, the reduction of the molecular oxygen-free catalyst is conducted at a temperature in the range from about 850° to about 950° F., and the chloride treatment of the reduced catalyst is effected at a temperature from about 700° to about 900° F.

3. The process of claim 1 wherein the drying of the catalyst is commenced during the oxidative burn-off of stem (1) and is continued during the oxygen treatment, purging and reduction in steps (2), (3) and (4).

* * * * *

PO-1050
(5/69)

UNITED STATES PATENT OFFICE
CERTIFICATE OF CORRECTION

Patent No. 3,625,860           Dated December 7, 1971

Inventor(s) John A. Condrasky, Robert E. Kline and Stanley J. Kwolek

It is certified that error appears in the above-identified patent and that said Letters Patent are hereby corrected as shown below:

Column 2, line 31, after "HCl", insert an end parenthesis.

Column 2, line 45, "technique" should be --reactivating--.

Column 2, line 63, "oxygen-containing" should be "combustion".

Signed and sealed this 23rd day of May 1972.

(SEAL)
Attest:

EDWARD M. FLETCHER, JR.          ROBERT GOTTSCHALK
Attesting Officer                  Commissioner of Patents